United States Patent [19]

Zurbrick et al.

[11] Patent Number: 4,972,397
[45] Date of Patent: Nov. 20, 1990

[54] DITHERING OPTICAL DATA LOGGER

[75] Inventors: Larry S. Zurbrick, San Jose; Robert L. Hazel, Newbury Park, both of Calif.

[73] Assignee: Drexler Technology Corporation, Mountain View, Calif.

[21] Appl. No.: 279,487

[22] Filed: Dec. 2, 1988

[51] Int. Cl.$^5$ ............................ G11B 7/85; G11B 7/09
[52] U.S. Cl. ............................ 369/44.16; 346/76 L; 346/108; 358/342; 369/44.39; 369/109; 369/116
[58] Field of Search ............... 235/454, 487; 358/342, 358/299; 369/44–46, 101, 103, 109, 111, 116, 117, 119, 44.15–44.16, 44.25, 44.39; 346/76 L, 108; 219/121.67, 121.7, 121.68

[56] References Cited

U.S. PATENT DOCUMENTS

| | | | |
|---|---|---|---|
| 3,932,701 | 1/1976 | Adler | 369/112 |
| 4,124,273 | 11/1978 | Huignard et al. | |
| 4,241,423 | 12/1980 | Burke et al. | 365/215 |
| 4,313,188 | 1/1982 | Bartolini et al. | 346/76 L X |
| 4,360,908 | 11/1982 | Howe et al. | 369/109 |
| 4,451,915 | 5/1984 | LaBudde et al. | 346/76 L X |
| 4,458,980 | 7/1984 | Ohki et al. | 369/103 X |
| 4,466,087 | 8/1984 | Cheng | 369/45 |
| 4,544,835 | 10/1985 | Drexler | 235/382.5 X |
| 4,644,516 | 2/1987 | Musha | 369/43 |

Primary Examiner—Aristotelis M. Psitos
Assistant Examiner—W. R. Young
Attorney, Agent, or Firm—Thomas Schneck

[57] ABSTRACT

A data logger which incorporates a laser diode and focusing optics for logging data pits in optical recording media. The focusing optics may be attached to a spring assembly and caused to oscillate by electromagnetic or mechanical means. As the optical elements oscillate, the focused beam dithers above and below the surface of the recording media. When the laser beam focal region is in the plane of the recording surface a pit or deformation is formed in the surface. Relative motion is provided between the recording surface and the laser beam spot for further writing on the recording surface.

23 Claims, 6 Drawing Sheets

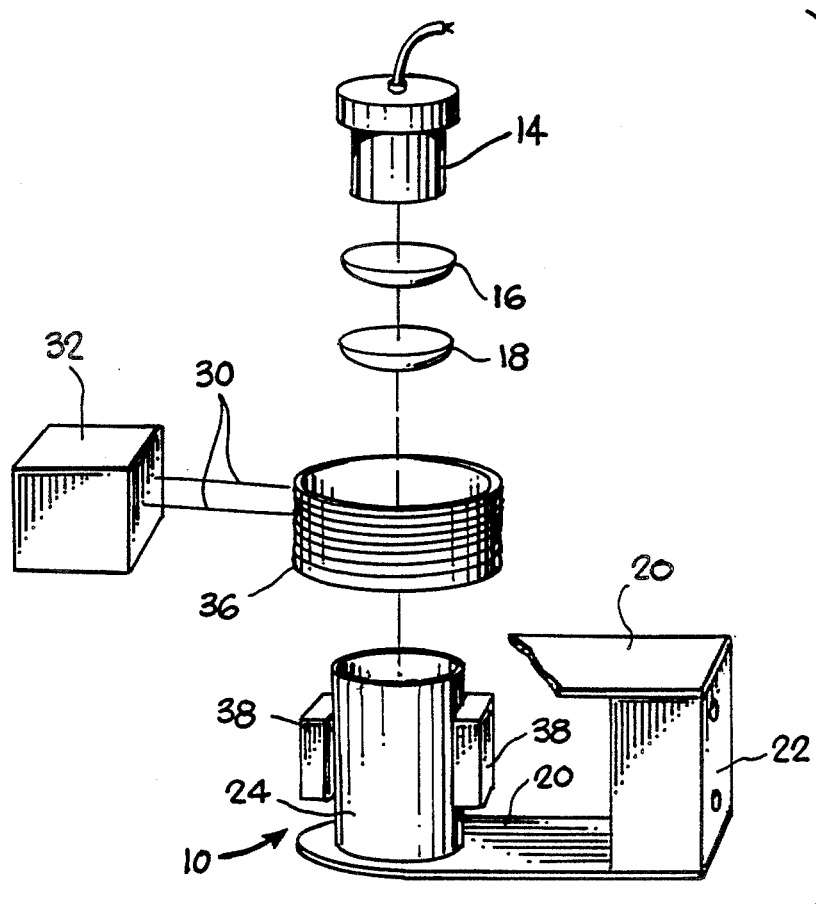
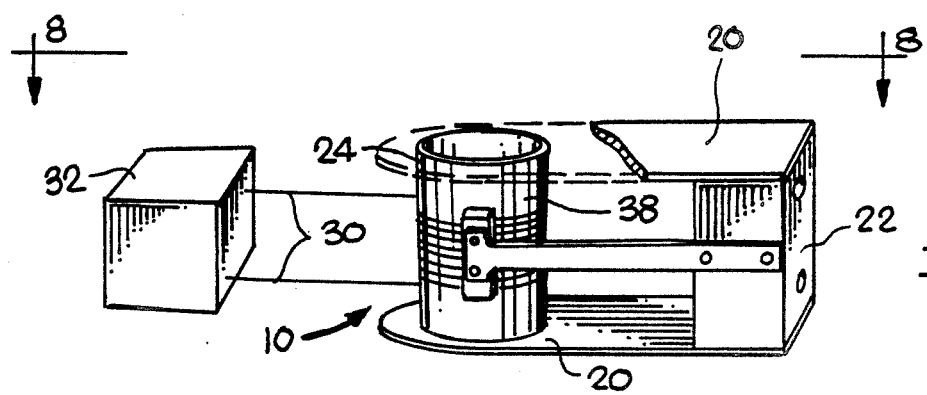
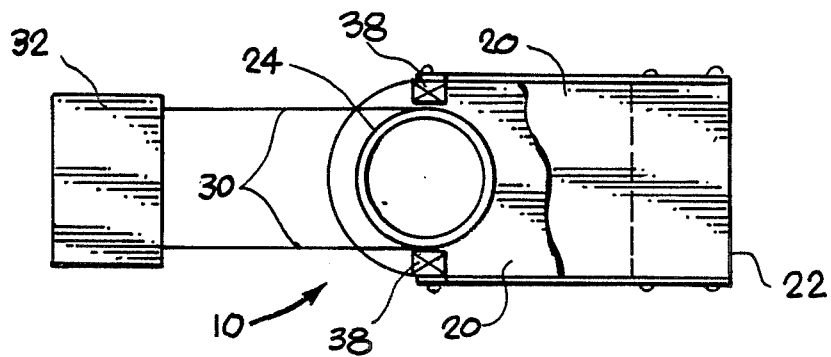

DITHERING OPTICAL DATA LOGGER

DESCRIPTION

1. Technical Field

This invention relates to optical data recorders which employ beams for writing data in optical recording media.

2. Background Art

The recording of digital data in optical recording media has been accomplished by recorders which make marks or holes in the surface of appropriate recording media. The marks have a different optical characteristic than the surrounding area of the recording surface, such as variations in reflectivity, optical path length or optical contrast. Therefore, the marks may be more or less reflective than the surrounding surface for the reflectivity example. One of the methods used to create these marks is to burn or melt the recording surface with a laser beam. Recorders which use a laser beam to make data marks usually focus the laser beam to a spot. When the laser beam is focused to a spot, autofocusing systems are generally used to ensure that the beam remains focused to a spot at the recording surface; otherwise a data mark may not be formed. For example, Ohki et al. in U.S. Pat. No. 4,458,980 teach an optical reproducing head which uses a focused laser beam to record information in an optical recording medium. A focus servo control system is used to keep the beam in focus. In recorders which use autofocus systems, a significant amount of energy is expended in designing the autofocus circuitry and associated hardware. There is also an associated increase in both the cost and the complexity of recorders which employ autofocus systems.

Recorders in which a laser beam is focused into a narrow beam make a mark wherever and whenever the beam impinges upon and heats the recording surface, provided that the laser is of high enough power. The mark is made by ablation, pitting or plastic deformation of the recording surface. Data marks made in this manner have a dimension of a less than one micron to several microns in diameter, and often the marks may not be uniform. Some marks may have high lips formed around the edges while other marks do not. Control of the recorded data and of the laser beam is made difficult because the laser must be pulsed on and off. Still another problem is that debris from the marks is deposited over the surface. A high power laser that is pulsed on and off will burn or blast a hole in the recording surface, scattering debris across the surface.

It is an object of the present invention to devise a low cost and simple data logger which ensures optimal focus, and does not cause debris to be scattered on the recording surface.

DISCLOSURE OF THE INVENTION

The above object has been met with a data logger which incorporates a relatively low power laser from which a beam is focused to an optimal focus and which is dithered in an up and down direction about a recording surface. The optimal focus is a spot which has just enough energy density to melt a small uniform pit into the recording surface without forming debris. The focused laser spot is initially above or below the plane of the recording surface and therefore out of focus in the recording plane. Focusing optics are then displaced either electromagnetically, piezoelectrically or mechanically through a range of movement that moves the focused laser spot through the plane of the recording surface. As the diameter of the laser spot in the recording plane decreases and approaches the optimal focus, the energy density of the laser spot becomes sufficient to form a pit in the recording surface. The speed of dithering is coordinated with the power of the laser so that pitting occurs without debris formation.

Various methods for producing the dithering effect of the laser beam spot may be employed by the present invention. In one embodiment a laser diode and focusing optics are encased in a housing which is attached to a flexure spring assembly. An electromagnetic actuator is placed in a driving position with the housing and spring assembly. The actuator is driven by a signal generator at a frequency below, at, or well above the natural mechanical frequency of the optics and spring assembly. Driving at the natural resonant frequency minimizes the electrical power required. The stiffness and length of the flexure springs and the mass of the optics assembly determine the resonant frequency. The actuator causes the optics and spring assembly to vibrate, thereby causing the focused laser spot to dither. An X,Y table may provide relative displacement between the recording surface and the laser beam for further writing. Such displacement may be applied to either the recording surface or the optics assembly.

In another embodiment, an electromagnet is placed coaxially around the optics assembly wherein the assembly incorporates magnetic material. A signal generator sends a driving signal to the electromagnet which causes the optics and spring assembly to oscillate and the focused laser spot to dither. Alternatively, only the objective lens of an optics assembly needs to oscillate to cause the focused laser spot to dither. This can be done with the objective lens attached to a flexure spring assembly or the objective lens can be oscillated alone in a voice coil arrangement.

The optics and spring assembly may also be oscillated by mechanical means such as a multi-faceted cam which when rotated deflects the optics and spring assembly with which the cam is linked. Oscillating levers may also be employed in a mechanical system for providing the necessary dithering movement. Further, a piezoelectric driver may provide the mechanical oscillation needed to dither the laser beam spot.

Centering the dithering movement of the laser beam spot about the recording plane may be found and maintained by processing a laser feedback signal which notes the duty cycle relative to the drive signal. The driving frequency may be optimized by using the difference in the phase of the laser feedback signal with that of the drive signal.

While only the optics are shown to oscillate to produce the dithering effect, the recording surface may also oscillate or dither by the same means used to oscillate the optics. In other words, the electromagnetic, piezoelectric and mechanical means used to vibrate the optics can be used to vibrate the recording surface about the focused laser beam spot.

Advantages of the present invention are lower cost and complexity due to not using an autofocus system. Writing is ensured since the in-focus beam will always pass through the plane of the recording surface. And a low power laser can be utilized which needs not to be pulsed on and off.

BRIEF DESCRIPTION OF THE DRAWINGS

FIG. 6 is an exploded perspective view of a data logger employing a coaxial electromagnet in accord with the present invention.

FIG. 7 is a perspective view of a variation of the data logger in FIG. 6 in which the coaxial electromagnet is attached to the housing.

FIG. 8 is a top view of the data logger of FIG. 7 taken along line 8—8 in FIG. 7.

BEST MODE FOR CARRYING OUT THE INVENTION

Figure 1:
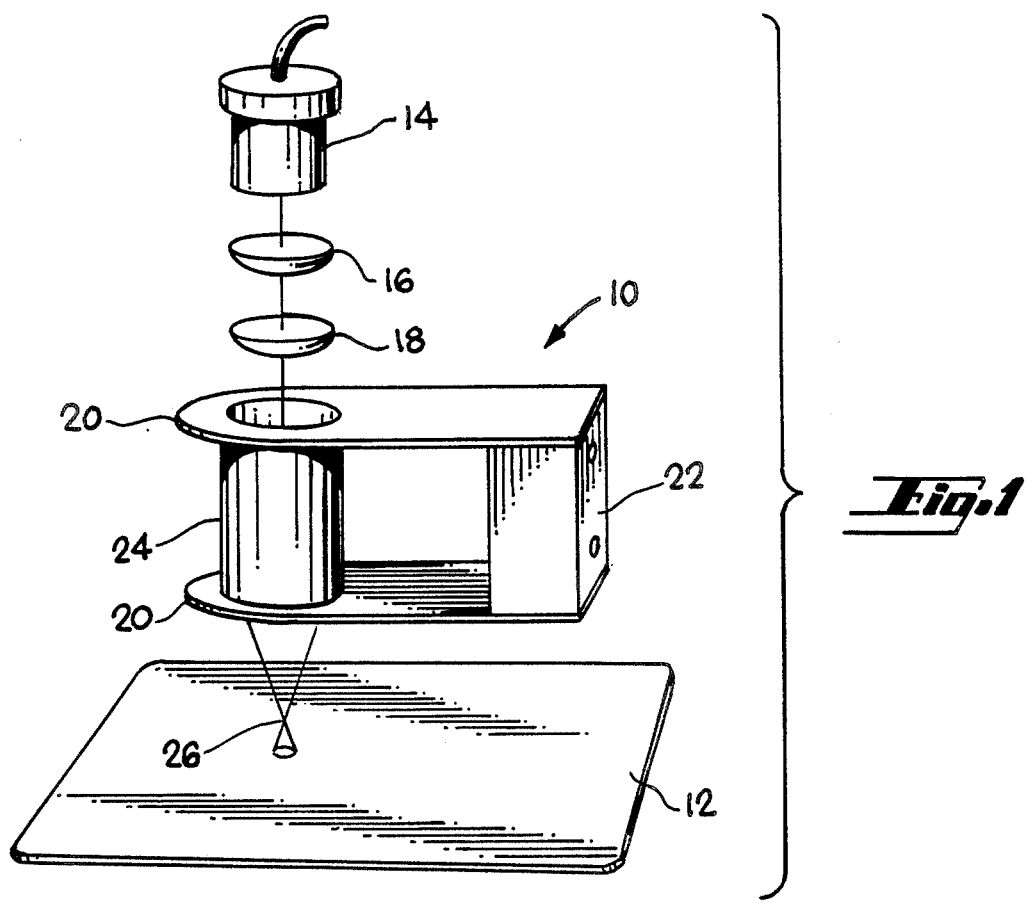
FIG. 1 is an exploded perspective view of an optics and spring dither assembly in a data logger of the present invention.
Figure 2:
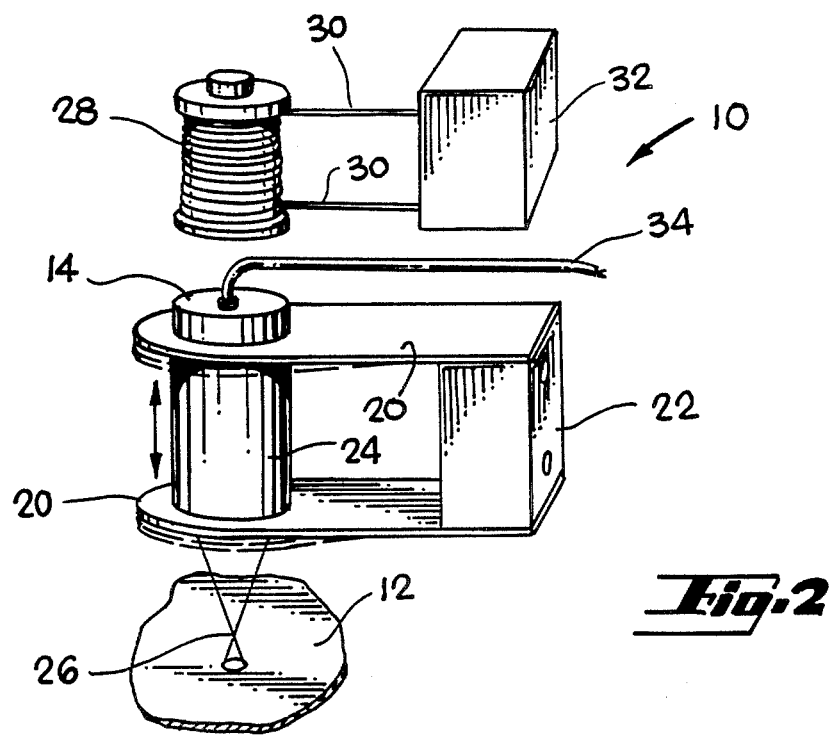
FIG. 2 is a perspective view of a data logger employing an electromagnetic actuator in accord with the present invention.

Referring to FIGS. 1 and 2, embodiment of the present invention is shown to include an optomechanical assembly 10 comprising a laser diode package 14, a collimating lens 16, and an objective lens 18, all of which are encased in an optics housing 24. Lenses 16 and 18 represent any focusing optics used in the present invention. The lenses used to focus the laser beam can be of conventional spherical multielement design, aspheric design, gradient index design, or a combination of the three. The choice is not critical as long as the beam can be brought to focus and this focus can be oscillated about the surface of interest. Optics housing 24 is attached to flexure springs 20 so that the center axis of the optics housing is perpendicular to the longitudinal axes of the flexure springs. The flexure springs are attached to the mounting block 22 so that the springs are parallel to each other. The recording surface or plane 12 may be any laser recording material supported from below. For example, a reflective laser recording material on a card of the type shown in U.S. Pat. No. 4,544,835, mounted for motion on a movable X-Y table, is preferred. Power is supplied to the laser diode package through power wire 34.

The optics and spring assembly 10 has a natural resonant frequency determined by the length and stiffness of the springs and the mass of the optics assembly. A magnetic actuator 28 of FIG. 2 receives a driving signal from a signal generator 32 through wires 30. To minimize the power dissipation and performance requirements of the actuator, the driving signal should be at the resonant frequency of the optics and spring assembly. However, the frequency of the driving signal may be below or well above the resonant frequency and still cause desired oscillation.

In operation, the optics enclosed in optics housing 24 focuses the laser beam emitted by the laser diode 14 to a spot 26 which has an energy density high enough, at the frequency of dithering, to form a pit or spot in the optical recording surface 12. Initially, the focused laser beam spot is above or apparently below the recording surface. As the optics and spring assembly 10 is caused to oscillate by the electromagnetic actuator 28 the laser beam spot dithers about the recording surface. As the laser beam spot moves through the plane of the surface, a pit or plastic deformation is formed in the surface. When the laser beam is out of focus in the recording plane, i.e. when the laser beam spot is above or below the plane, the beam does not have a sufficient energy density to form a pit in the surface. Since the laser beam spot will always move through the recording plane, optimal focus of the laser beam is always ensured. A light detector diode in the laser diode package 14 may be used to detect the existence of the pit. The planar recording surface is moved in an X,Y plane generally perpendicular to the beam for continuous writing, or the beam is moved with respect to the recording surface.

Figures 3, 4, 5:
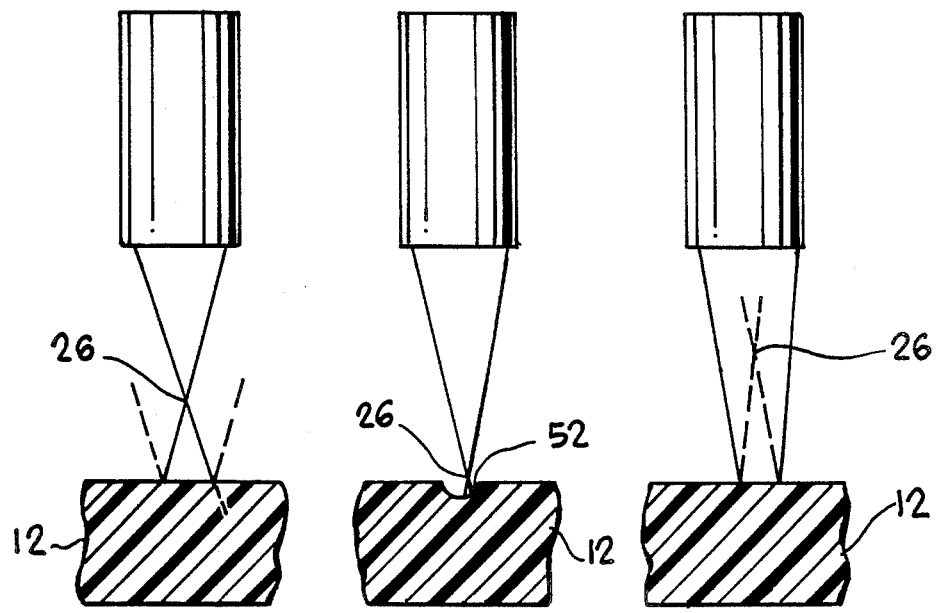
FIGS. 3-5 are plan views of a recording medium and a laser beam, illustrating operation of the present invention.

With reference to FIGS. 3-5, a plurality of focused laser beam positions are shown. As the focused laser beam spot 26 dithers about the recording plane 12 the area of the laser beam in the recording plane decreases as the focused laser beam spot 26 approaches the recording plane. The energy density of the laser beam is inversely proportional to the cross sectional area of the beam. When the laser beam spot is in the recording plane for an appropriate time, the energy density is high enough to form the pit 52 in the surface. As the laser spot moves away from the recording plane the area of the beam in the recording plane increases such that the energy density is not sufficient to form a pit. In FIG. 3 focused laser beam spot 26 is above recording plane 12. In FIG. 4 the laser beam spot is in the recording plane and pit 52 is formed. FIG. 5 shows the laser beam spot as it would be focused apparently below the recording surface, but actually at a reflected spot 26, above the surface. The event shown in FIG. 4 is the optimal recording geometry.

Referring to FIG. 6, the data logger shown here is similar to that of FIG. 2. In the present logger of FIG. 6, the electromagnet 36 is placed coaxially around the optics housing 24 which now incorporates permanent magnets 38. The magnets may be attached to the optics housing or be embedded in the housing or the contents of the optics housing. Alternatively, the electromagnet 36 may be attached to the optics housing 24 and external magnets 38 used, as is shown in FIGS. 7 and 8. In this case permanent magnets 38 are supported by mounting block 2 and held stationary while electromagnet 36 which is now attached to optics housing 24 oscillates. Another embodiment, not shown, would have just the objective lens 18 in the optics housing oscillating while the laser diode package 14 and the collimating lens 16 remained stationary and not enclosed by the optics housing, thereby lowering the oscillating mass.

Figure 9:
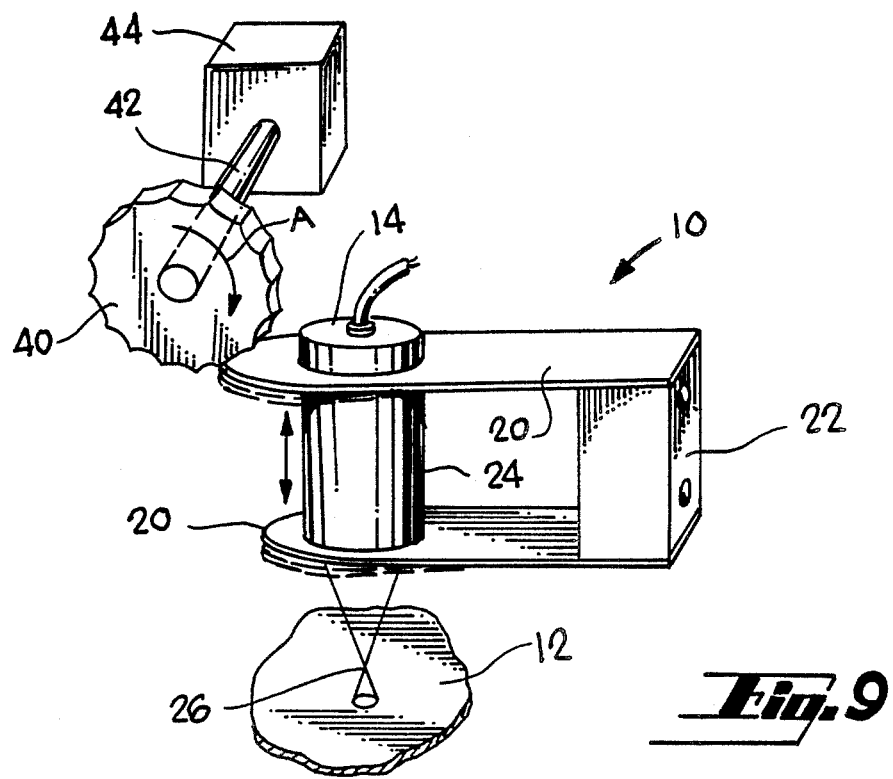
FIG. 9 is a perspective view of a data logger employing a multi-faceted cam in accord with the present invention.

In FIG. 9, the optics and spring assembly 10 is caused to oscillate by a multi-faceted cam 40 which is shown to rotate in the direction indicated by arrow A. Drive rod 42 is in drive association with the multifaceted cam and the drive source 44. As the multifaceted cam rotates, the facets deflect the optics and spring assembly causing the laser beam spot 26 to move up and down or dither. With each facet to facet change the laser beam spot will be in focus in the recording plane twice.

Figure 10:
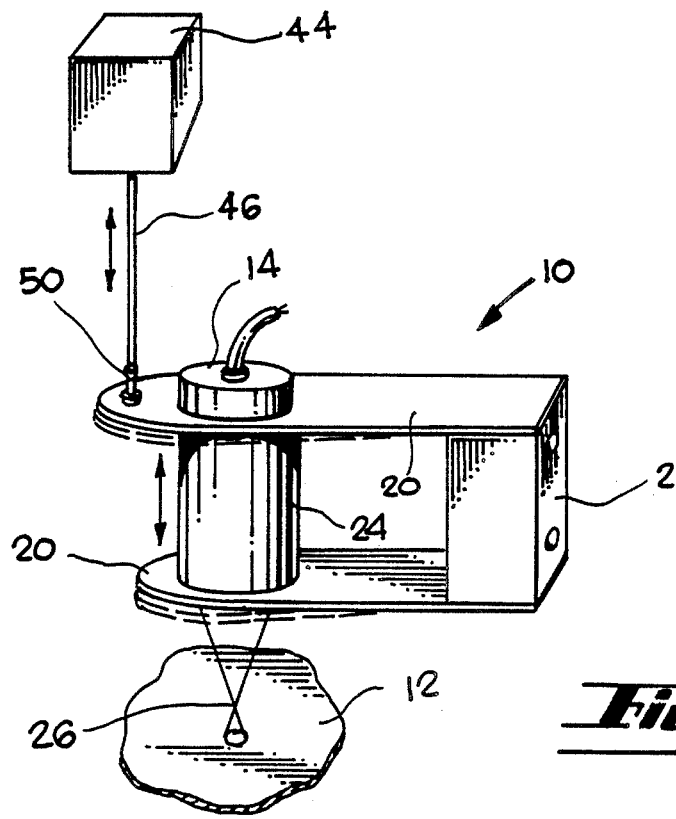
FIG. 10 is a perspective view of a data logger employing a lever in accord with the present invention.

Referring to FIG. 10, the optics and spring assembly 10 is seen to include the piston rod 46 which is in drive association with the drive source 44 and connected to the optic and spring assembly through the pivot 50. As piston rod 46 moves up and down, the optics and spring assembly oscillate, thereby dithering the laser beam spot 26. The drive source 44 may be a piezoelectric transducer.

Figure 11:
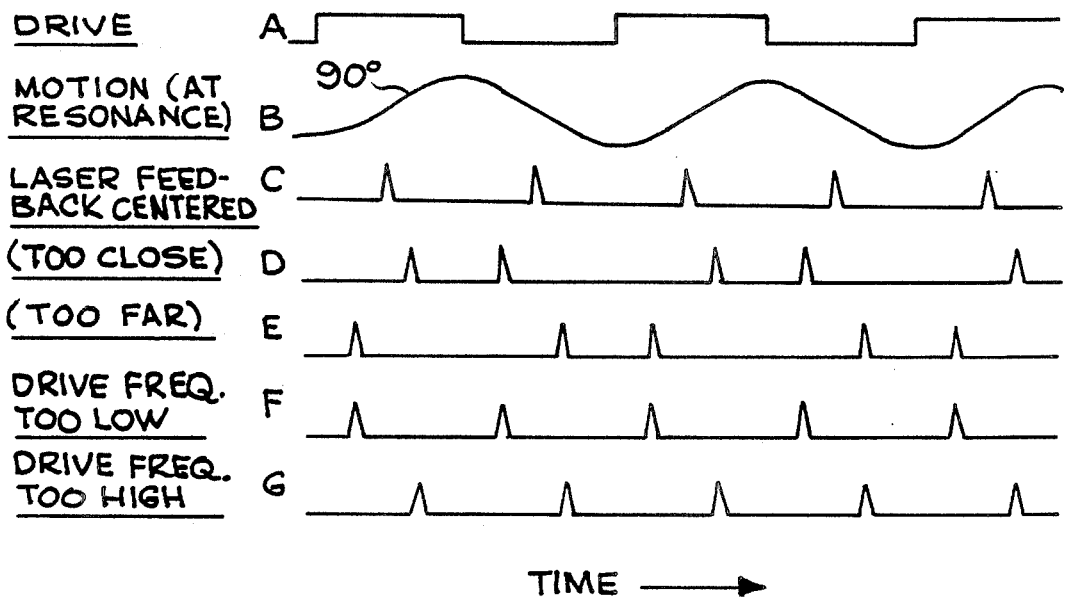
FIG. 11A-G, is a series of plots of amplitude versus time for a dither assembly of the present invention.

In FIG. 11, several plots are shown, illustrating operation of the invention. Plot A is of the ideal drive signal. The frequency is at the resonant frequency of the optics and spring assembly. Plot B shows the motion of the laser beam focused spot when at resonance and when centered about the recording surface. The laser beam is in focus at 90° and 27°. Plot C is of the laser feedback signal when the dithering of the laser beam focused spot is centered above and below the recording surface. The feedback signal is a result of laser energy feeding back into the laser causing more efficient lasing. An optical detector incorporated in the laser diode package observes the feedback laser energy reflected from the recording surface, thereby producing the feedback signal.

Typically, the recording surface and the optical assembly are moved relative to one another at a constant velocity during continuous writing. Plots D and E show the laser feedback signal when not centered due to distancing the dither assembly, principally the optical elements, too close or too far from the recording surface. The non-uniformly spaced laser feedback signal, as shown, corresponds to where data marks would be recorded. Such non-uniform spacing is deleterious in continuous writing because of the problem it would cause when the data is to be read back. Without uniform spacing a reader system would have a difficult time determining where to look for data marks. One approach to this problem would be to use the laser feedback signal to center the dither oscillation about the recording surface. Another approach would be writing data on every other in-focus condition. This approach halves the data writing rate, but results in a uniform spacing of data marks and simplifies the electronics needed.

Plots F and G are of the dither assembly drive signal when the drive frequency is too low or too high, the result of which is a phase error, affecting the predictability of a writing event. By comparing the laser feedback signal's phase and duty cycle relative to the drive signal the optimum frequency and offset or spacing for dithering can be achieved.

Figure 12:
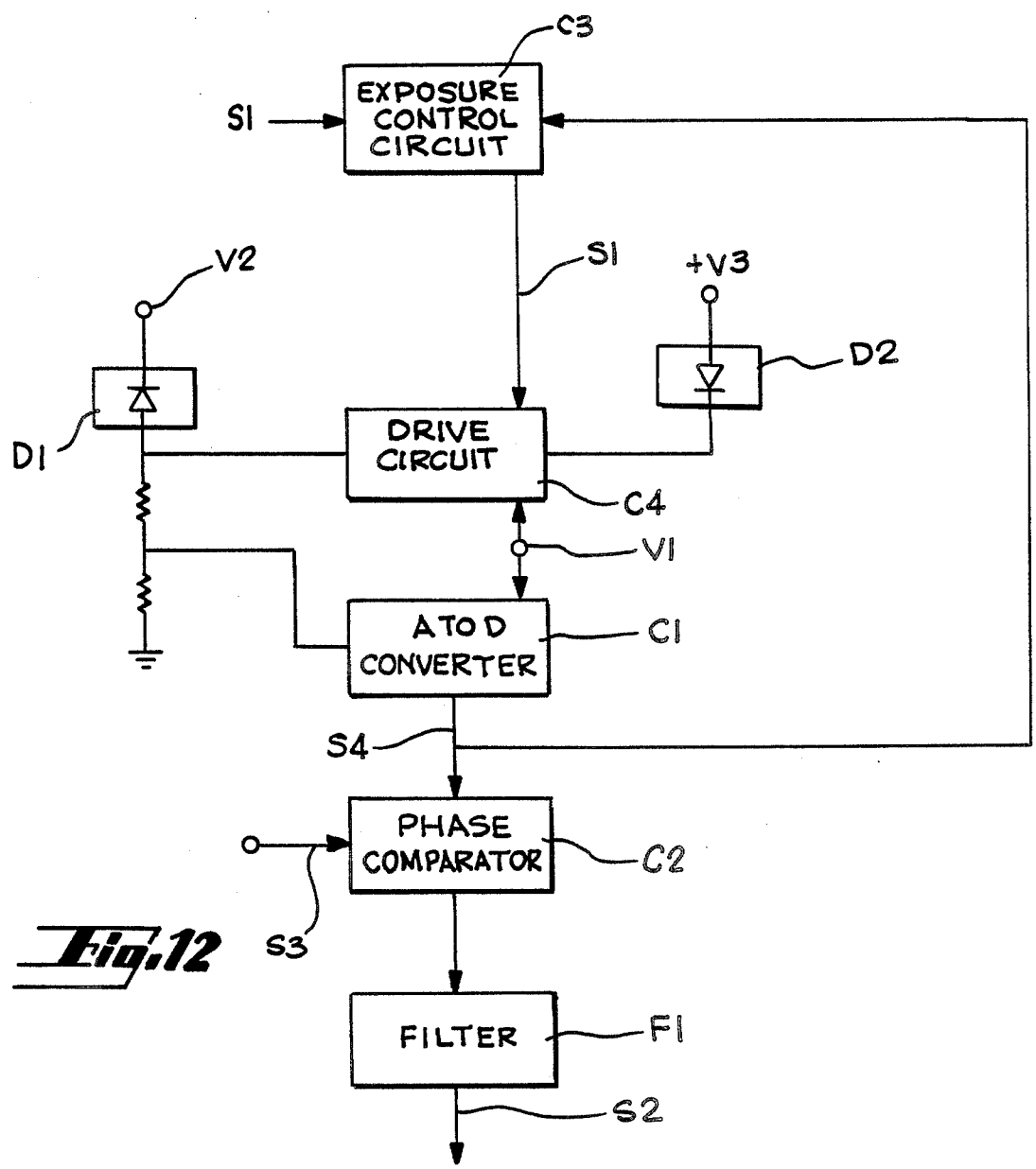
FIG. 12 is a block diagram for autocentering circuitry.
Figure 13:
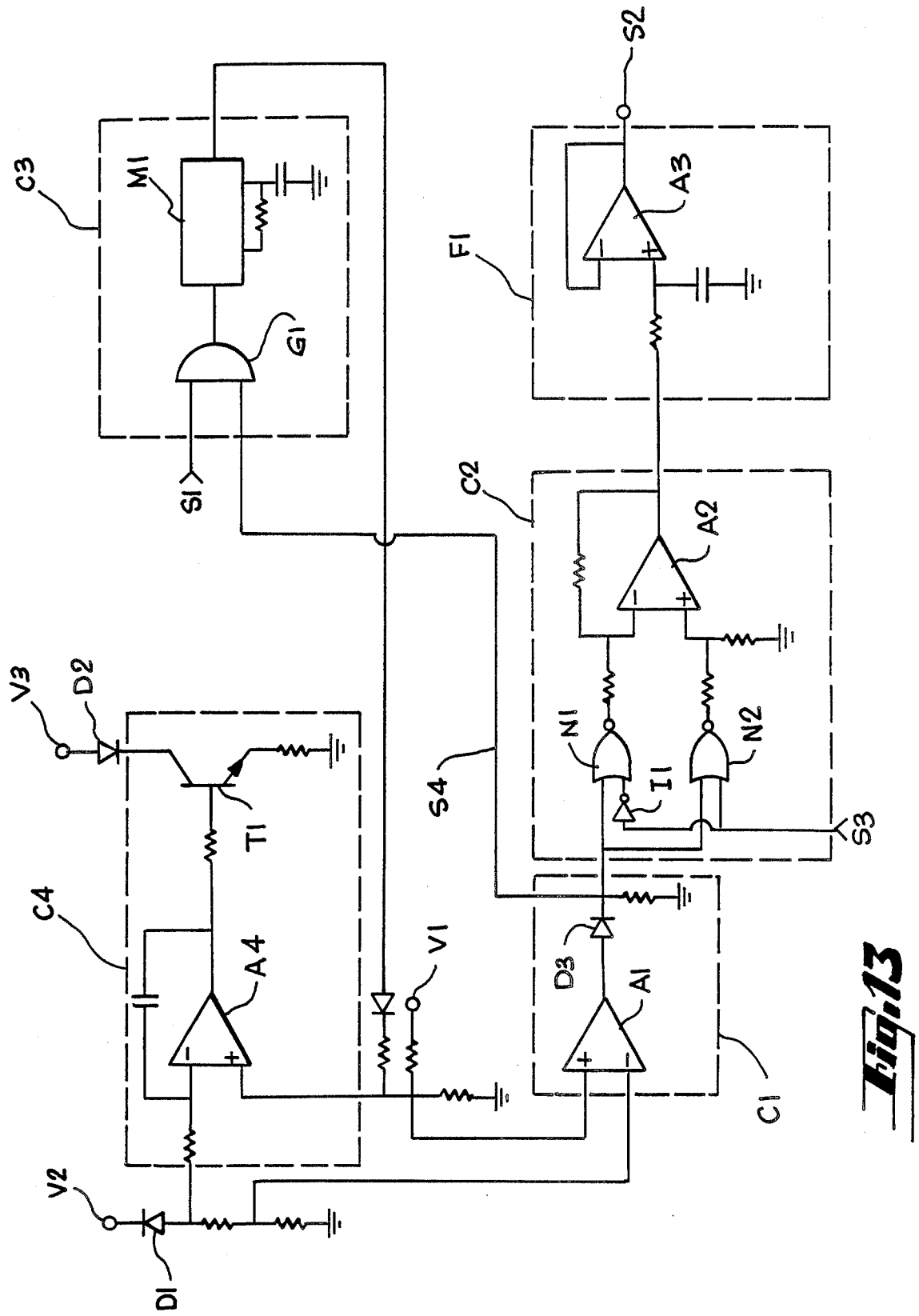
FIG. 13 is a schematic diagram showing an embodiment of the Circuitry depicted in FIG. 12.

In reference to FIGS. 12 and 13, the monitor diode D1, which is part of the laser diode assembly, provides a signal which is proportional to the laser diode D2 output power. Due to the nature of the laser diode lasing action and the optical arrangement used, a substantial amount of energy is fed back into the laser diode D2, and thus into the monitor diode, as the optical system comes into focus. This causes the lasing action of the laser diode to become more efficient resulting in an increase in the monitor diode D1 output. The output of the monitor diode D1 is fed to a circuit C1 which detects this increase of laser diode output power above the baseline output power reference signal V1 and converts this signal to a binary quantity. This signal S4 is called the laser feedback signal (LFS). Circuit C1, as shown in FIG. 13, comprises operational amplifier A1 in series with diode D3. The LFS is fed to the phase detector circuit C2 along with the signal S3 which drives the lens actuator. Phase detector circuit C2 comprises two NOR gates N1 and N2 in parallel, an inverter I1, and an operational amplifier subtracter circuit A2. As an input to NOR gate N1, lens actuator signal S3 is inverted by inverter I1. The output of the phase detector circuit C2 is fed to a low frequency pass filter F1 which provides a signal S2 proportional to the amount and direction of focus error. This signal S2 is called the centering error signal (CES). Filter F1 comprises operational amplifier A2 and a resistor/capacitor network. The CES is fed into a circuit, not shown, which drives the lens actuator in such a manner that the lens maintains its center of oscillation about the surface it is focused on. The laser exposure time is controlled by an exposure control circuit C3, the laser feedback signal S4, and the data write signal S1. The laser feedback signal S4 and the data write signal S1 are gated together through an "AND" logic circuit G1. The output of G1 controls the one shot multivibrator circuit M1. The output of the exposure control circuit C3 is connected to the laser diode driver circuit C4 which is used to turn the laser diode "on" and maintain it at a fixed average level of output. The average level of output is determined by the direct current voltage level at V1. The circuit shown in FIG. 13 is given only as an example and does not limit the circuitry implemented by the invention.

In this application, the terms "above" and "below" refer only to relative directions and not to absolute directions.

What is claimed is:

1. A data logger used for creating digital data spots in optical recording media comprising,
   a light source providing a collimated light beam,
   optical means in association with the light source, for focusing the light beam into an optimal beam region having a sufficient energy density to form a pit in a planar optical recording surface,
   means for providing oscillation of said focused beam so that said optimal beam region is displaced relatively above and below the plane of said planar optical recording surface, and
   means for providing relative linear motion between the light beam and the optical recording surface, thereby bringing new recording surface areas into the path of the beam.

2. The data logger of claim 1 further comprising a light detector disposed to receive light from said collimated beam after impingement with said recording surface.

3. The data logger of claim 2 further comprising a means for centering said oscillation of said optimal beam region about the plane of the recording surface.

4. The data logger of claim 1 wherein the means for providing oscillation is an electromagnetic actuator in communication with a signal generator.

5. The data logger of claim 1 wherein said means for providing oscillation is an electromagnet placed coaxially with said optical means and in communication with an electrical signal generator, said optical means having an associated magnetic field.

6. The data logger of claim 1 wherein said oscillation is provided by a multi-faceted cam associated with a drive rod and a drive source.

7. The data logger of claim 1 wherein said oscillation is provided by a piezoelectric oscillating source.

8. The data logger of claim 1 wherein said means for relative linear motion between the light beam and the recording surface is provided by a leadscrew assembly.

9. A data logger used for recording digital data in optical recording media comprising,
   a laser diode package producing a laser light beam and having at least one light detector,
   optical means in association with said laser diode package for focusing the laser beam into an optimal beam region which has sufficient energy density to form a pit in a planar optical recording surface, said focused beam having insufficient energy density in the plane of the recording surface to form a pit when said optimal beam region is not in said plane,
   means for providing oscillation of said optimal beam region relative to the recording surface so that said beam region is displaced above and below the plane of said planar optical recording surface,
   means for centering said oscillation of the optimal beam region about the plane of the recording surface, and
   means for providing relative linear motion between the light beam and the optical recording surface, thereby bringing new recording surface areas into the path of the beam.

10. The data logger of claim 9 wherein said means for relative oscillation is provided by an electromagnetic actuator in communication with a signal generator.

11. The data logger of claim 9 wherein said means for relative oscillation is provided by an electromagnet associated coaxially with said optical means, which optical means has an associated magnetic field.

12. The data logger of claim 9 wherein said means for relative oscillation is provided by a multi-faceted cam in association with a drive rod and a drive source.

13. The data logger of claim 9 wherein said means for relative oscillation is provided by a piezoelectric oscillating source.

14. The data logger of claim 9 wherein said means for relative linear motion is provided by a leadscrew assembly.

15. A data logger used for recording digital data in optical recording media comprising,
   a laser diode package producing a laser light beam and having at least one light detector,
   optical means in association with the laser diode package for focusing the laser beam into an optimal beam region which has sufficient energy density to form a pit in the optical recording surface,
   a housing enclosing the optical means and the laser diode package, said housing being supported by flexure springs,
   means for oscillating said housing so that the optimal beam region of the laser beam is displaced relative above and below the optical recording surface, and
   means for providing relative motion between the laser beam and the optical recording surface.

16. The data logger of claim 15 further comprising a means for centering said displacement of the optimal beam region about the recording surface.

17. The data logger of claim 15 wherein the means for providing oscillation is an electromagnetic actuator in communication with a signal generator.

18. The data logger of claim 15 wherein said means for providing oscillation is an electromagnet placed coaxially with the housing and in communication with an electrical signal generator, said housing having an associated magnetic field.

19. The data logger of claim 15 wherein the means for providing oscillation is a multi-faceted cam associated with a drive rod having a drive source.

20. The data logger of claim 15 wherein the means for providing relative motion between the light beam and the recording surface is provided by an X,Y table associated with the recording surface.

21. The data logger of claim 15 wherein the means for providing oscillation is a piezoelectric oscillating drive source.

22. A method for logging data using a focused light beam writing on a planar optical recording surface comprising,
   dithering a focal region of the light beam relative to the optical recording surface so that the focal region moves above and below the plane of the recording surface causing a data spot to be formed when the focal region passes through the plane of the recording surface, and
   displacing in a linear manner, transverse to the dithering direction, the optical recording surface relative to the light beam.

23. The method of claim 22 further comprising centering said dithering of the focal region about the plane of the recording surface.

* * * * *